(12) United States Patent
Johnson

(10) Patent No.: US 7,302,499 B2
(45) Date of Patent: Nov. 27, 2007

(54) INTERNET MODEM STREAMING SOCKET METHOD

(75) Inventor: Michael Johnson, Petaluma, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/203,471

(22) Filed: Aug. 11, 2005

(65) Prior Publication Data

US 2005/0271042 A1 Dec. 8, 2005

Related U.S. Application Data

(62) Division of application No. 09/965,952, filed on Sep. 27, 2001, now Pat. No. 7,039,717.

(60) Provisional application No. 60/247,265, filed on Nov. 10, 2000.

(51) Int. Cl.
*G06F 13/00* (2006.01)

(52) U.S. Cl. ............ 709/250; 709/217; 709/227; 709/237

(58) Field of Classification Search ........ 709/217, 709/219, 227, 228, 237, 250
See application file for complete search history.

(56) References Cited

U.S. PATENT DOCUMENTS

| | | | |
|---|---|---|---|
| 5,513,324 A | 4/1996 | Dolin, Jr. et al. | 395/200.18 |
| 5,579,316 A | 11/1996 | Venters et al. | 370/94.1 |
| 5,628,030 A * | 5/1997 | Tuckner | 710/64 |
| 5,682,534 A | 10/1997 | Kapoor et al. | 395/684 |
| 5,684,954 A | 11/1997 | Kaiserswerth et al. | 395/200.2 |
| 5,754,768 A | 5/1998 | Brech et al. | 395/200.6 |
| 6,148,336 A * | 11/2000 | Thomas et al. | 709/224 |
| 6,198,479 B1 | 3/2001 | Humpleman et al. | 345/329 |
| 6,226,680 B1 | 5/2001 | Boucher et al. | 709/230 |
| 6,247,060 B1 | 6/2001 | Boucher et al. | 709/238 |
| 6,334,153 B2 | 12/2001 | Boucher et al. | 709/230 |
| 6,360,281 B1 * | 3/2002 | Feagans | 710/1 |
| 6,377,996 B1 * | 4/2002 | Lumelsky et al. | 709/231 |
| 6,389,479 B1 | 5/2002 | Boucher et al. | 709/243 |
| 6,393,487 B2 | 5/2002 | Boucher et al. | 709/238 |
| 6,427,171 B1 | 7/2002 | Craft et al. | 709/230 |
| 6,427,173 B1 | 7/2002 | Boucher et al. | 709/238 |

(Continued)

FOREIGN PATENT DOCUMENTS

WO WO98/35480 8/1998

(Continued)

OTHER PUBLICATIONS

Tanenbaum et al. "Structured Computer Organization, 5th edition" Prentice Hall PTR, Upper Saddle River, NJ. USA, Jun. 2005.

(Continued)

*Primary Examiner*—Viet D. Vu
(74) *Attorney, Agent, or Firm*—Zilka-Kotab, PC

(57) ABSTRACT

An Internet client communicates with an Internet server such as an HTTP server or SMTP server through a TCP streaming socket on the Internet device with the Internet client. The TCP streaming sockets can be established through an Internet ready command line interface. The Internet ready command line interface includes "IR" commands that can establish, resume, release and terminate TCP sockets.

17 Claims, 5 Drawing Sheets

U.S. PATENT DOCUMENTS

| | | | |
|---|---|---|---|
| 6,434,620 B1 | 8/2002 | Boucher et al. | 709/230 |
| 6,470,415 B1 | 10/2002 | Starr et al. | 711/104 |
| 6,591,302 B2 | 7/2003 | Boucher et al. | 709/230 |
| 6,625,640 B1 * | 9/2003 | Zou et al. | 709/200 |
| 6,658,480 B2 | 12/2003 | Boucher et al. | 709/239 |
| 6,687,758 B2 | 2/2004 | Craft et al. | 709/250 |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,807,581 B1 | 10/2004 | Starr et al. | 709/250 |
| 6,922,727 B2 * | 7/2005 | Banerjee | 709/227 |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,996,070 B2 | 2/2006 | Starr | 370/252 |
| 7,042,898 B2 | 5/2006 | Blightman | 370/463 |
| 2001/0021949 A1 | 9/2001 | Blightman et al. | 709/219 |
| 2001/0023460 A1 | 9/2001 | Boucher et al. | 709/250 |
| 2001/0027496 A1 | 10/2001 | Boucher et al. | 709/250 |
| 2001/0036196 A1 | 11/2001 | Blightman et al. | 370/465 |
| 2001/0037397 A1 | 11/2001 | Boucher et al. | 709/230 |
| 2001/0037406 A1 | 11/2001 | Philbrick et al. | 709/250 |
| 2001/0047433 A1 | 11/2001 | Boucher et al. | 709/250 |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0147839 A1 | 10/2002 | Boucher et al. | 709/250 |
| 2002/0156927 A1 | 10/2002 | Boucher et al. | 709/250 |
| 2002/0161919 A1 | 10/2002 | Boucher et al. | 709/238 |
| 2003/0079033 A1 | 4/2003 | Craft et al. | 709/230 |
| 2003/0140124 A1 | 7/2003 | Burns | 709/220 |
| 2003/0167346 A1 | 9/2003 | Craft et al. | 709/250 |
| 2003/0200284 A1 | 10/2003 | Philbrick et al. | 709/219 |
| 2004/0003126 A1 | 1/2004 | Boucher et al. | 709/250 |
| 2004/0054813 A1 | 3/2004 | Boucher et al. | 709/250 |
| 2004/0062245 A1 | 4/2004 | Sharp | 370/392 |
| 2004/0062246 A1 | 4/2004 | Boucher et al. | 370/392 |
| 2004/0064578 A1 | 4/2004 | Boucher et al. | 709/236 |
| 2004/0064589 A1 | 4/2004 | Boucher et al. | 709/250 |
| 2004/0064590 A1 | 4/2004 | Starr et al. | 709/250 |
| 2004/0073703 A1 | 4/2004 | Boucher et al. | 709/245 |
| 2004/0078462 A1 | 4/2004 | Philbrick et al. | 709/22 |
| 2004/0088262 A1 | 5/2004 | Boucher et al. | 705/65 |
| 2004/0100952 A1 | 5/2004 | Boucher et al. | 370/389 |
| 2004/0111535 A1 | 6/2004 | Boucher et al. | 709/250 |
| 2004/0117509 A1 | 6/2004 | Craft et al. | 709/250 |
| 2004/0158640 A1 | 8/2004 | Philbrick et al. | 709/230 |
| 2004/0158793 A1 | 8/2004 | Blightman et al. | 714/758 |
| 2004/0240435 A1 | 12/2004 | Boucher et al. | 370/352 |
| 2005/0122986 A1 | 6/2005 | Starr et al. | 370/412 |
| 2005/0141561 A1 | 6/2005 | Craft et al. | 370/474 |
| 2005/0160139 A1 | 7/2005 | Boucher et al. | 709/203 |
| 2005/0175003 A1 | 8/2005 | Craft et al. | 370/389 |
| 2005/0182841 A1 | 8/2005 | Sharp | 709/228 |
| 2005/0198198 A1 | 9/2005 | Craft et al. | 709/217 |
| 2005/0204058 A1 | 9/2005 | Philbrick et al. | 709/238 |
| 2005/0278459 A1 | 12/2005 | Boucher et al. | 709/250 |
| 2006/0010238 A1 | 1/2006 | Craft et al. | 709/227 |
| 2007/0062245 A1 | 3/2007 | Fuller et al. | 72/413 |

FOREIGN PATENT DOCUMENTS

| | | |
|---|---|---|
| WO | WO0013091 A1 | 3/2000 |
| WO | 02/027519 A1 | 4/2002 |
| WO | 02/39302 A1 | 5/2002 |
| WO | 2005/057945 A2 | 6/2005 |
| WO | 2005/057945 A3 | 6/2005 |

OTHER PUBLICATIONS

European Search Report from application No. 98/959558 which was completed on Nov. 10, 2005.

Tanenbaum et al. "Structured Computer Organization, 4th edition" Prentice Hall PTR, Upper Saddle River, NJ. USA, 1998.

PCT International Search Report from PCT/US01/47083 mailed Apr. 8, 2002.

Zuquete et al., Transparent Authentication and Confidentially for Stream Socket, IEEE Micro, pp. 34-41, especially pp. 35-36, 1996.

* cited by examiner

INTERNET MODEM STREAMING SOCKET METHOD

This application is a divisional of U.S. patent application Ser. No. 09/965,952, filed Sep. 27, 2001, now Pat. No. 7,039,717, which claims benefit of U.S. provisional patent application Ser. No. 60/247,265, filed on Nov. 10, 2000.

TECHNICAL FIELD

The invention relates generally to Internet communication technology, and more particularly to a system and method that provide streaming socket connection between Internet client and Internet server through an Internet modem.

BACKGROUND OF THE INVENTION

A standard modem can be in either one of two modes, command mode or data mode. In a command mode, no data is passed across the modem. The modem operation is controlled using standard modem "AT" or other commands. When the modem is connection to another modem, it goes into data mode. Changing back to command mode can be done with an escape sequence.

As for any standard modem, the following guidelines are used when issuing commands:
  When using "AT" commands, start every command line (except the "A/" and "+++" commands) with an attention ("AT") code characters. Otherwise, the modem will not execute the command.
  The commands following the "AT" prefix can be uppercase, lowercase, or a combination of both.
  Always type the "AT" prefix in the same case (not "At" or "aT").
  Telephone numbers may be entered with or without punctuation.
  Commands must be terminated with a carriage-return character. This is typically ASCII 13 (0x0D). However, it can be changed by modifying the modem S-Register number 3.

Each command line to a modem has the following format (with the exception of the "A/" and "+++" commands):
  <AT><Command>{Argument}{=n}{ }

Wherein "<AT>" is the attention code, "<Command>" is a command consisting of one letter of an ampersand ("&"), percent ("%"), or backslash ("\") followed by a letter, "{Argument}" is optional information specific to the Command, and "{=n}" is used in some instance to qualify an Argument specific to the Command. The information in angle brackets ("<>") must be included as part of the command line, while information in curly braces ("{}") may or may not be necessary as part of the command line. It is also possible to string commands together in one command line. The attention code "AT" is only required at the beginning of the command line.

In the command mode, characters received from the serial port are interpreted as commands and must follow the guidelines described above. The modem transitions from the command mode to the data mode after a successful "ATD" command or after receiving a call in auto-answer mode. To transition from the data mode to the command mode, an escape, either a sequence of characters or toggling the DTR line, must be sent to the modem. This sequence is typically "+++", however, this can be changed to another repeated character by modifying the modem S-Register number 2. Typically, a delay with no data transfer of one second before and after this escape sequence is required. This time delay can be changed by modifying the modem S-Register number 12. The "ATO" command is used to resume the data mode without having to hang-up and redial.

A separate TCP socket application is usually added to establish Internet connection once the modem is in data mode. However, it is often desirable that a TCP streaming socket can be opened on the modem so that an Internet client can directly communicate with an Internet server over the socket.

SUMMARY OF THE INVENTION

The streaming sockets technology according to this invention offers power and flexibility that are not garnered by traditional service based on batch commands excited in command mode.

A streaming socket is a highly efficient way of utilizing a TCP socket over an asynchronous or synchronous serial data channel like an RS-232 serial port without the need for complex framing or encapsulation. It allows the client device to send and receive data over a TCP socket by simply reading and writing characters on the data channel. The streaming-socket doesn't need to know beforehand how much data is going to be exchanged, it simply allows a free flowing stream of data between the TCP socket and the client over the data channel. It also incorporates the concept of a streaming socket timer that allows the streaming socket to efficiently packetize the serial data stream into TCP segments. The socket streaming timer is tunable to provide maximum efficiency when utilized from various types of data sources, whether interactive or machine driven. Streaming sockets are also an effective way to share the data channel with many TCP sockets.

An Internet modem provides full modem functionality in addition to the Internet connectivity. The interface to the Internet modem is identical to that of a standard modem. Standard "AT" modem commands can be issued to the Internet modem and the behavior is the same as it is for a standard modem.

The internet modem is an extension of the command mode and data mode idea used in standard modem. In an Internet ready modem, there are two Internet session modes besides the standard command mode and data mode. The Internet session modes are Internet session command mode and Internet session streaming socket mode. The standard command mode and data mode are same as these of a standard modem. A "T" command or an "R" command enables Internet session streaming socket mode. Once in Internet session streaming socket mode, any data sent to the Internet modem is sent across the TCP socket, and data received on the socket is sent from the modem. Internet session streaming socket mode can be terminated by the standard modem escape sequence or by toggling the DTR. Once in Internet session command mode, the last streaming socket can be resumed, or another streaming socket can be started or resumed.

The Internet modem dials up an Internet Service Provider (ISP) and uses data mode to send a username and password string to the ISP. Once the username and password have been accepted, it returns to command mode by escaping out of data mode. Once back in data mode, PPP is raised, a TCP connection is initiated and Internet session streaming socket mode is entered. The TCP transaction is completed via the streaming socket. Once completed, Internet session streaming socket mode is escaped back into Internet session command mode where the socket can be closed and more commands can be executed.

Several streaming sockets can be used at the same time by escaping out of one streaming socket and creating or entering another streaming socket.

The communication method provides a straightforward way to transmit and receive data with an HTTP server. This is not limited to HTML content because any ASCII data can be transmitted via HTTP. The use of CGI can make this a powerful tool. Alternatively, an Internet client can use the Internet modem to communicate to an SMTP server.

DETAILED DESCRIPTION OF THE INVENTION

A. The Communications Network

Figure 1:
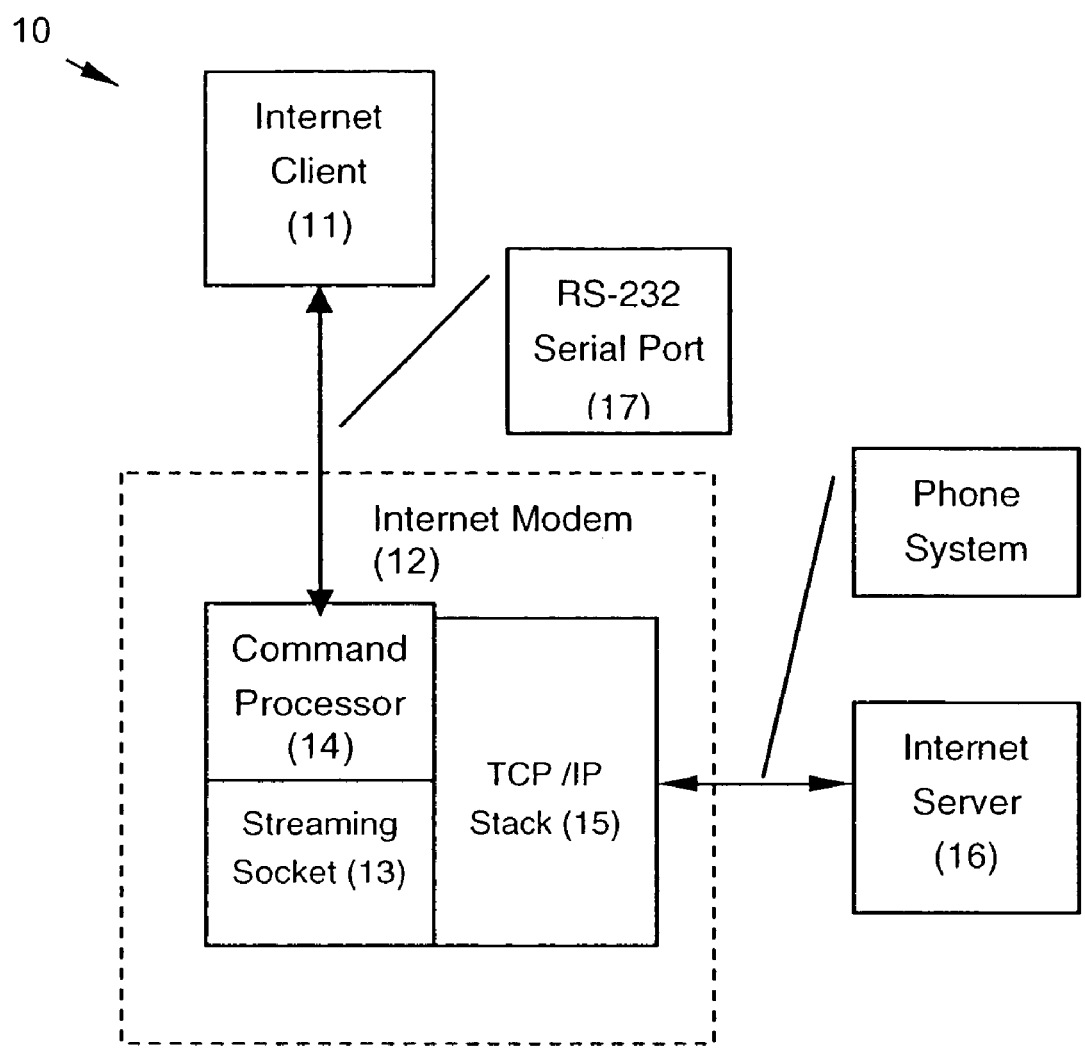
FIG. 1 is a block schematic diagram showing a computer network comprising an Internet server and an Internet client that contains an Internet modem.

FIG. 1 is a block schematic diagram that illustrates a computer network 10 comprising of an Internet client 11, an Internet modem 12, and an Internet server 18. The Internet modem 12 contains a Streaming Socket 13, a command processor 14 that interprets an Internet ready command line interface, and a TCP/IP stack 15.

The Internet client 11 communicates with the Internet modem 12 through the Internet Ready command line interface over an RS-232 serial port 17. The command processor 14 instructs the TCP/IP stack 15 to open and close sockets, send and receive data, and provide other network functionality. The command processor 14 can also switch the Internet modem to Internet session streaming socket mode where the streaming socket 13 is attached directly to an open socket in the TCP/IP stack 15 and the serial port 17. The streaming data is sent from the Internet modem 12 to the Internet server 18 through a phone system 18.

The Internet modem 12 also contains the following Internet specific S-Registers:

S0-S1: Socket 0/1 Status

These registers read the operating status of the two physical sockets in the Internet modem 12. They each contain a 3-character string that represents their current status. These registers are read-only. Any attempt to write to them will fail silently.

S2-S3: Socket 0/1 Source Port

These registers read the source port of the two physical sockets in the Internet modem 12. They are either set by a parameter in a "T" command or randomly generated if the parameter is omitted. These registers contain a character string that represents the port number. Valid port numbers are between 1 and 655535. These registers are read-only. Any attempt to write to them will fail silently.

S4: IP Address of Internet Modem

This register stores the local device IP address. If the Internet modem is used with a static IP address, this register must be set with a valid address before the "C" command is executed. If this value is not set before "C" command is executed, the Internet modem 12 negotiates a valid "IP" address during PPP negotiations. In that case, the value is only valid while PPP is active, between the execution of a "C" command and "D" command. It then shows the current negotiated IP address for the Internet modem 12. The register contains a character string that represents the IP address. The string is in the "dotted decimal" format: xxx.xxx.xxx.xxx (i.e. 192.168.2.10). When the IP address is invalid, it returns the invalid IP address: 0.0.0.0.

S5: Primary DNS Server

This register stores the primary DNS server address. If the register is not set, hostname lookups will fail. The register contains a character string that represents the IP address. The string is in the "dotted decimal" format: xxx.xxx.xxx.xxx (i.e. 192.168.2.10). When the IP address is invalid, it returns the invalid IP address: 0.0.0.0.

S6: IR Configuration Byte

This register returns or can be set with a ASCII hex byte. The byte is assembled with the following bits:

0x01=Echo in Command Modes (0=off\1=on(default))

0x02=Echo in Streaming Socket Mode (0=off\1=on (default))

0x04=Result Codes Verbose (0=off\1=on(default))

0x08=Internet Mode Escape Sequence (inband escape)(0=off\1=on(default))

0x10=Internet Modem Data Mode Escape (0=off\1=on(default))

0x80=Debug Streaming Socket Marker (0=off(default)\1=on)

S7: TCP Stream Tick Time

This register contains the TCP Stream Tick Time used to determine when to send TCP segments. Valid range is 0 through 255 units. Each unit is equal to 10 ms. Default is 50.

SE: EEPROM Read/Write/Play Slots

This register lets the user take advantage of non-volatile memory that may exist on the device. The EEPROM memory is divided up into slots of 32 characters each. The number of slots available is dependent on the system design, typically 8 or 16. Slot 0 is a special slot that is automatically executed on modem power-up and is useful to set the modem in a default state on power-up. Slots can be used for AT commands, IR commands, or for user storage. Data can be written to slots, read from slots, or sent to the IR and AT command processors for "playback". Multiple commands can be stored for playback in one slot if separated by the " " (backward single quote) character.

For Example:

To store a reset modem command and DNS server init command that will execute on reset:

irse0=ATZ`irs5=192.168.1.1

To echo slot zero back:

irse0

To playback slot 1 to the IR and AT command processors:

irse1!

To store a dial string in slot 2:

irse2=ATDT9,5559874

B. The Command Line Interface

The Internet modem 12 extends the standard modem modes with two additional Internet session modes. When the Internet modem 12 is not in the Internet session modes, it behaves exactly like a standard modem, and can be in either the command mode or data mode. In the Internet session modes, the Internet modem 12 can be in either Internet session command mode or Internet session streaming socket mode. However, the Internet modem 12 does not behave exactly like a modem in these two modes. In Internet session command mode, characters received from the serial port are interpreted as commands and must follow the guidelines described above. In this case, only "IR" commands are interpreted by the command processor 14. Standard modem "AT" commands are not supported in this mode. In Internet session streaming socket mode, the Internet modem receives characters from the serial port, converts the data to Internet protocol packets, then converts them to analog signals and transmits these signals over the telephone line.

The Internet ready command line interface accepted by the command processor 14 consists of several "IR" commands. These "IR" commands follow the same guidelines as the stand modem "AT" commands:

When using "IR" commands, start every command line (except the "+++" commands) with the Internet ready ("IR") code characters.

The commands following the "IR" prefix can be uppercase, lowercase, or a combination of both.

Always type the "IR" prefix in the same case (not "Ir" or "iR").

Commands must be terminated with a carriage-return character. This is typically ASCII 13 (0x0D). However this can be changed by modifying the modem S-Register number 3.

Each command line to a modem follows the format:

<IR><Command>{Argument}

Wherein "<IR>" is the Internet ready code, "<Command>" is a command consists of one letter, and "{Argument}" is optional information specific to the Command. The information in angle brackets ("<>") must be included as part of the command line, while information in curly braces ("{ }") may or may not be necessary as part of the command line. For the "IR" commands, it is not possible to string commands together in one command line.

The Internet ready command line interface 14 includes the following "IR" commands:

"C" command to initialize the connect mode

This command starts device connection and negotiates PPP. It may take some time to return. When finished, the Internet modem transitions to Internet session command mode. Only "IR" commands can be sent to the Internet modem after this command executes. The syntax of this command is IRCn{username, password}

Wherein n can be 0 or 1 with a default value of 0. When n is set to 1, PAP authentication is used, and therefore the username and password must be provided. The username and password represents the PAP authentication user name and password respectively. The possible responses that may be returned include:

"CONNECT" (1): Connection is established
"ERROR" (4): Invalid command format
"PPP FAILED" (80): PPP negotiation failed
"D" command to terminate the connect mode This command starts device termination and device terminates PPP. When finished, the Internet modem 12 transitions to standard modem command mode. The syntax of this command is

IRD

No parameters are needed for this command. The possible responses that may be returned include:

"OK" (0): Command executed. Return to standard modem command mode
"ERROR" (4): Invalid command format
"PPP DOWN" (81): PPP is not up
"T" command to connect to TCP server This command starts device connection to server through TCP socket. When finished, the Internet modem transitions to Internet session streaming socket mode. Any data sent to the serial port is sent through the open TCP socket. To return to Internet session command mode, the Internet modem must be escaped or the server must terminate the TCP connection. The syntax of this command is IRTn,<server:port>{;}

Wherein n can be 0 or 1 to specify the socket number to connect, server is the IP address or name of the server to connect to, port is the TCP port number on the server to connect to. If the last character on the command line is a semicolon, the Internet modem 12 returns to Internet session command mode rather than the Internet session streaming socket mode. The connection is still created and alive. The possible responses that may be returned include:

"OK" (0): Command executed. Return to command mode.
"CONNECT" (1): Connection is established
"ERROR" (4): Invalid command format
"PPP DOWN" (81): PPP is not up
"TCP FAILED" (82): TCP negotiation failed
"SOCKET INUSE" (85): Socket already in use
"SOCKET RESET" (86): Socket reset by peer
"R" command to resume socket connection This command resumes Internet session streaming socket mode with the selected socket. The socket must have been connected with either a "T" command with a ";" argument, or "T" command and then escaped with "+++". The Internet modem 12 transitions to Internet session streaming socket mode. To return to Internet session command mode, the Internet modem 12 must be escaped or the server 18 must terminate the TCP connection. The syntax of this command is IRRn Wherein n can be 0 or 1 to specify the socket number to resume. The possible responses that may be returned include:

"OK" (0): Command executed. Return to command mode
"CONNECT" (1): Connection resumed
"ERROR" (4): Invalid command format
"PPP DOWN" (81): PPP is not up
"SOCKET DOWN" (84): Socket not connected
"X" command to release socket connection This command closes the selected socket and releases the socket resources. The syntax of this command is IRXn Wherein n can be 0 or 1 to specify the socket number to release. The possible responses that may be returned include:

"OK" (0): Command executed

"ERROR" (4): Invalid command format

"PPP DOWN" (81): PPP is not up

"SOCKET DOWN" (84): Socket not connected

"U" command to allocate UDP socket

This command sets up a socket resource to allow UDP communications. The syntax of this command is IRUn,<port>

Wherein n can be 0 or 1 to specify the socket number to allocate, port is the UDP port number to listen for packets on. The possible responses that may be returned include:

"OK" (0): Command executed.

"ERROR" (4): Invalid command format.

"PPP DOWN" (81): PPP is not up.

"SOCKET BUSY" (90): Socket is already in use and must be released first.

"G" command to get UDP data from socket.

This command returns a UDP datagram from socket if it exists. The syntax of this command is IRGn Wherein n can be 0 or 1 to specify the socket to check for data on. The possible responses that may be returned include:

"OK" (0) ip:port, len: [data] cr/lf: Datagram is available and returned, wherein ip is 4 bytes, port is 2 bytes, len is 2 bytes and data is len bytes "ERROR" (4): Invalid command format "PPP DOWN" (81): PPP is not up "NO DATA" (81): No data is waiting "SOCKET DOWN" (81): Socket not allocated "P" command to put data out UDP socket This command sends a UDP datagram containing desired data. The syntax of this command is IRPn, <server:port>,<len:[data]>

Wherein n can be 0 or 1 to specify the socket to send data to, server is the IP address or name of the server to send datagram to, port is the UDP port number to send datagram to, len is 2 byte to specify the length of data. The possible responses that may be returned include:

"OK" (0): Datagram was sent

"ERROR" (4): Invalid command format

"PPP DOWN" (81): PPP is not up

"NO DATA" (81): No data is waiting

"SOCKET DOWN" (81): Socket not allocated

"S" A command to set or show S-Register

This command is used to set and show the Internet specific S-Registers of the Internet modem 12. The registers are used to store various operating parameters of the Internet modem 12. The syntax of this command is IRSn?, IRSn=y Wherein n specifies the Register number to access, y is the new value to set the register to.

"O" command to turn off Internet session modes

This command turns off the Internet session modes. It can not be turned back on except by reset the power. The syntax of this command is

IRO

A result code is issued from the Internet modem 12 for standard "AT" commands as well as "IR" commands. The result codes may be issued in either of two possible formats: words (the long form, also known as verbose) or numeric characters (the short form, represented by digits). The result code format is set using the "ATV" command, ATV1 (default) for words, and ATV0 for numeric characters.

Word result codes are preceded and followed by a carriage-return (typically ASCII 13 (0x0D)) and line-feed (typically ASCII 10 (0x0A)) character. These characters are defined by modem S-Registers numbers 3 and 4. Numeric character result codes are terminated by the same carriage-return character that command lines are terminated with (ASCII 13 (0x0D)).

One can modify or change the values of an S-Register from the command mode with the "ATSn=" command. One can read the current value of an S-Register from the command mode with the "ATSn?" command.

The command processor 14 interprets some standard modem "AT" commands that modify the command mode interface. These include "ATE" for setting the echo mode, "ATV" for changing the result code format, and "ATS" for changing the interface command characters. These commands affect the command mode for both the "AT" commands and the "IR" commands.

C. Connect Internet Client to Internet Server

Figure 2:
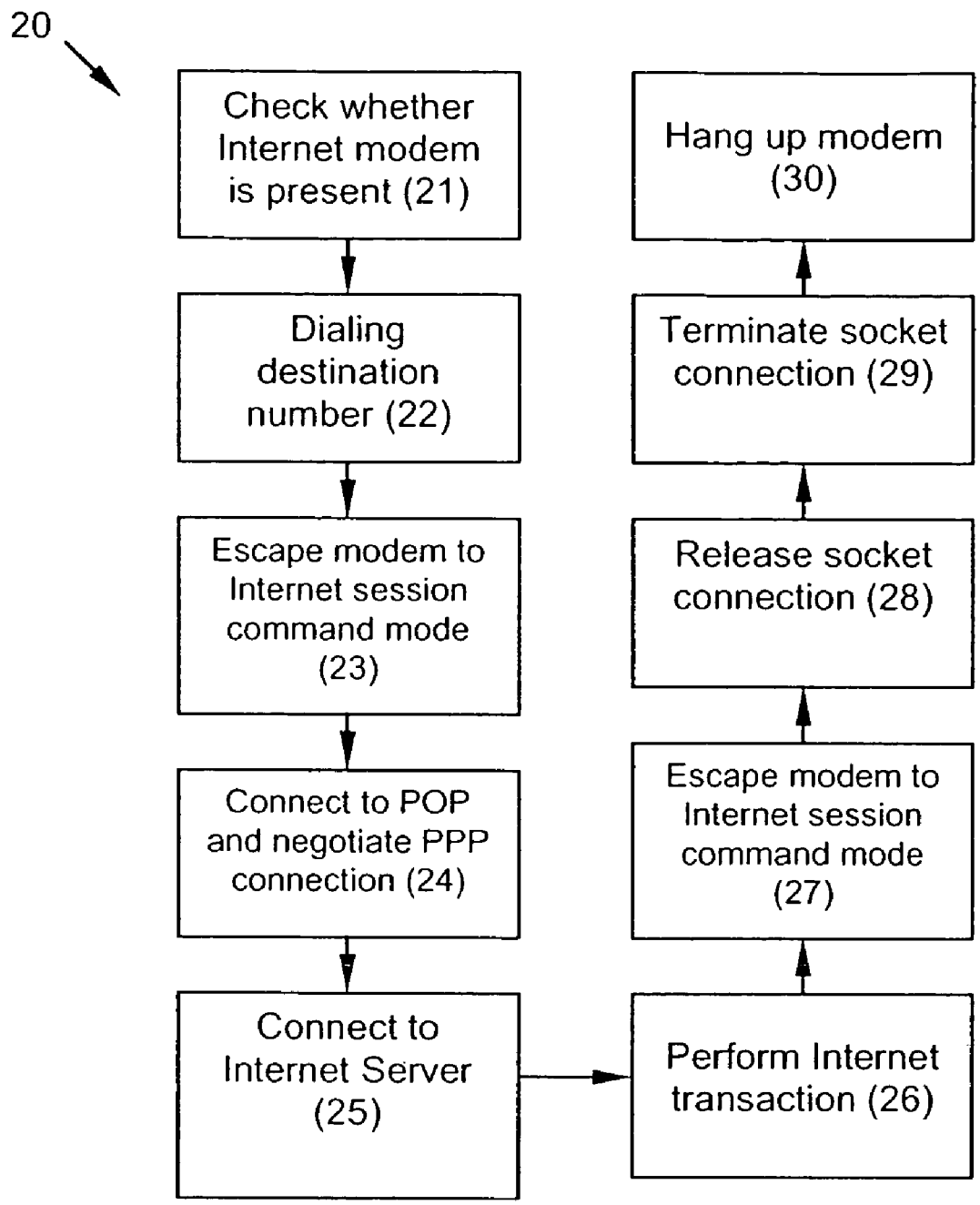
FIG. 2 is a flow diagram of a method for establishing the communication between the Internet client and the Internet server through the Internet modem.

Now referring to FIG. 2, illustrated is a flow diagram 20 of a method for establishing the communication between the Internet client 11 and the Internet server 18 through the Internet modem 12. The method includes the following steps:

21. Checking whether an Internet modem is present.

Command to Modem: IR

Response from Modem: OK

22. Dialing the modem to a destination number switching modem to data mode.

Command to Modem: ATDT14089614565

Response from Modem: CONNECT

Figure 3:
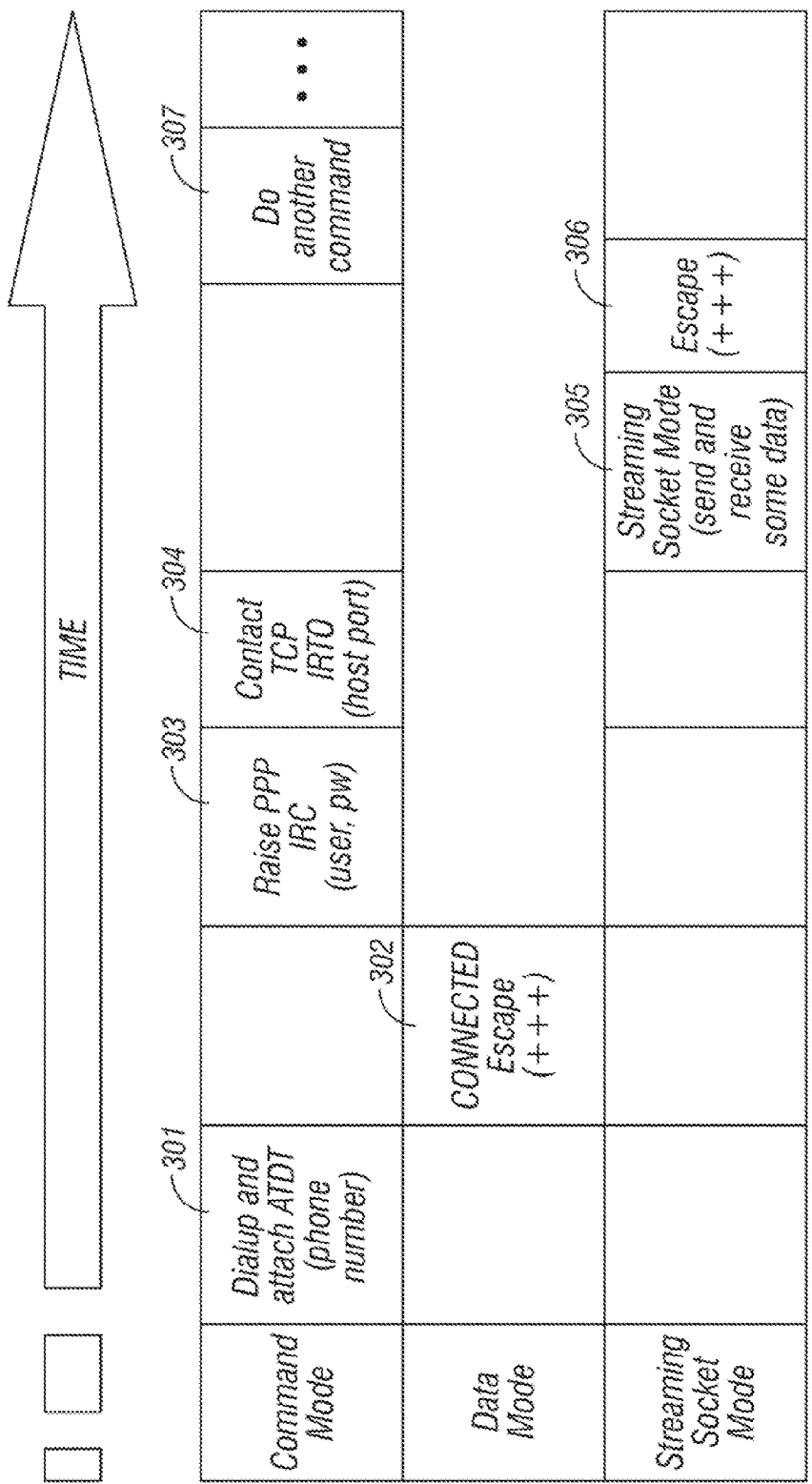
FIG. 3 is a diagram showing sample command sequence to establish a TCP connection over a streaming socket.

The sample command is shown as 301 and the response is shown as 302 in the command sequence diagram (FIG. 3).

23. Escaping the Internet modem from data mode to command mode.

Command to Modem: +++

Response from Modem: OK

The sample command is shown as part of 302 in the command sequence diagram (FIG. 3).

24. Connecting to the POP and negotiating a PPP connection using the "C" command and switching the Internet modem 12 to Internet session command mode.

Command to Modem: IRC1username, password

Response from Modem: CONNECT

The sample command is shown as 303 in the command sequence diagram (FIG. 3).

25. Connecting to the Internet server 18 using the "T" command and establishing a TCP socket connection for one streaming socket.

Command to Modem: IRT0, 192.168.1.20:80,4321

Response from Modem: CONNECT

The sample command is shown as 304 in the command sequence diagram (FIG. 3).

26. Performing necessary Internet transactions between the Internet client 11 and the Internet server 18. This step is also shown as 305 in FIG. 3.

The Internet client 11 can post data to a CGI script on an HTTP server and receive response from the server. Alternatively, the client can connect to an SMTP server and send out emails to target email addresses.

27. Escaping the Internet modem 12 from Internet session streaming socket mode to Internet session command mode.

Command to Modem: +++

Response from Modem: OK

The sample command is shown as 306 in the command sequence diagram (FIG. 3).

Figure 4:
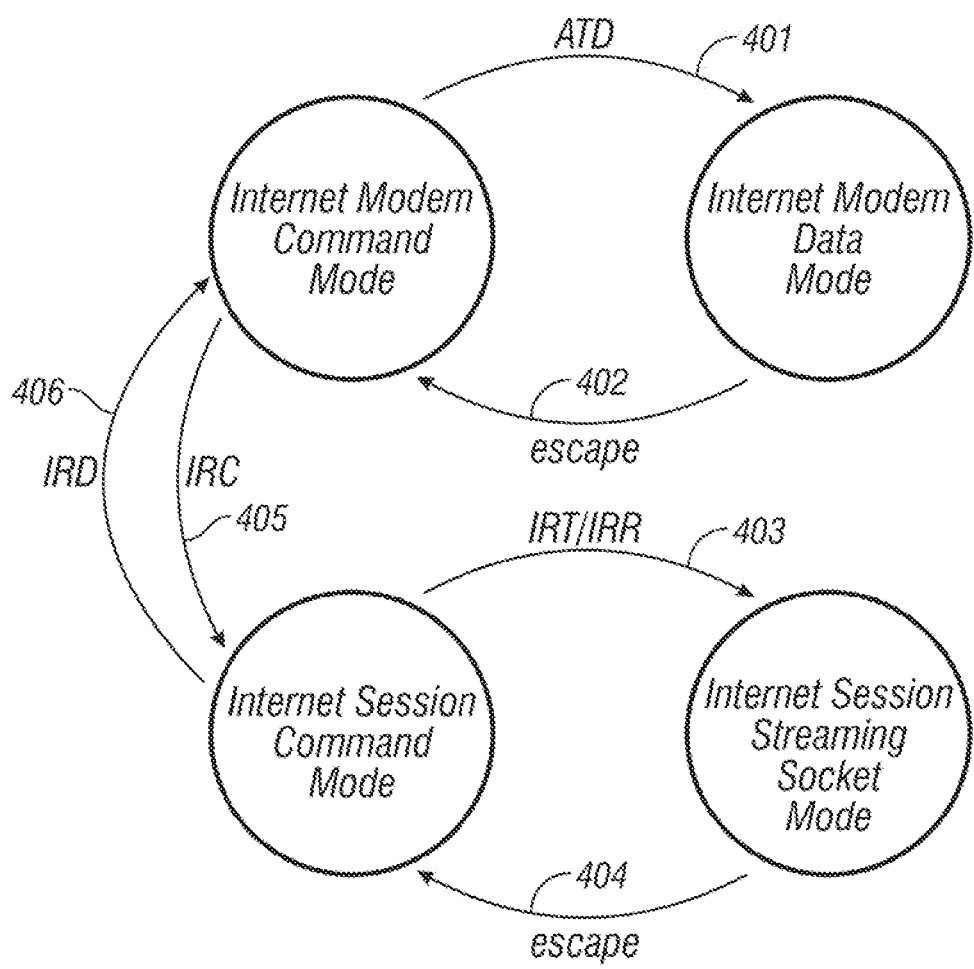
FIG. 4 is a state transition diagram for the Internet ready device.

28. Releasing the socket connection using the "X" command.
   Command to Modem: IRX0
   Response from Modem: OK
29. Terminating the socket connection using the "D" command.
   Command to Modem: IRD
   Response from Modem: OK
30. Hanging up the Internet modem 12 using standard "ATH" modem command.
   Command to Modem: ATH
   Response from Modem: OK FIG. 4 shows the state transition diagram for the Internet modem. The Internet modem transits from Internet modem command mode to Internet modem data mode after a successful "ATD" modem command (401). It then transits back to Internet modem command mode following an Escape sequence (402). An "IRC" command negotiates PPP connection and transits the Internet modem to Internet session command mode (403) and an "IRT" or "IRR" command opens or resumes a TCP socket and transits the Internet modem to Internet session streaming socket mode (404). An escape sequence transits the Internet modem to Internet session command mode (405) and an "IRD" command transits the Internet modem to Internet modem command mode (406).

The method described above assumes the negotiating of a PPP connection is using the Password Authentication Protocol. However the method is equally applicable when negotiating of a PPP connection does not use the Password Authentication Protocol.

While escaping back to Internet session command mode, another command can be executed. This is shown as 307 in FIG. 3. One can create another TCP connection attached to other streaming sockets and perform interaction between the Internet client and a second Internet server by escaping out of one streaming socket.

Figure 5:
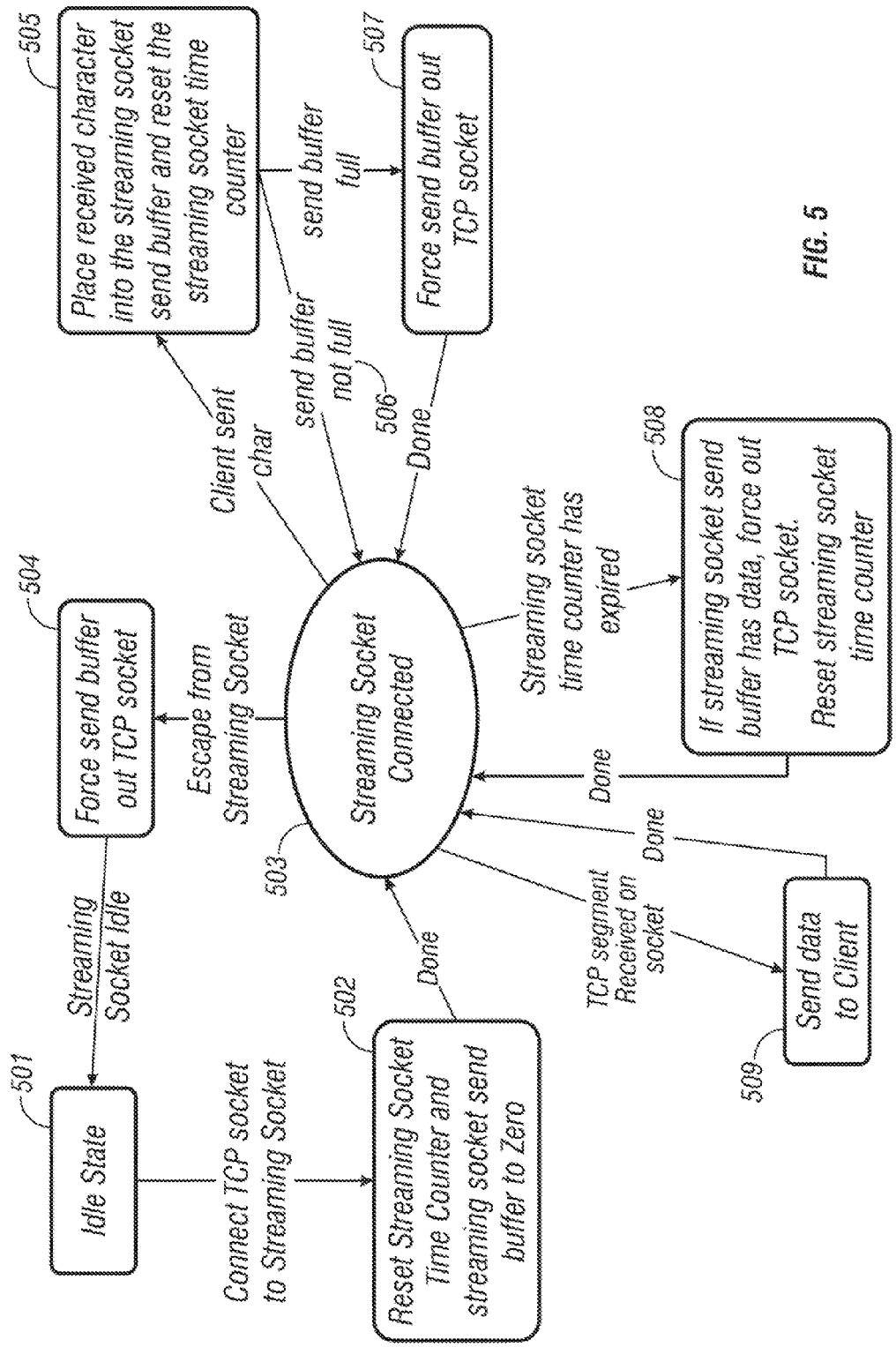
FIG. 5 is a state transition diagram showing the flow from connecting a TCP socket to a streaming socket, using the streaming socket and closing streaming socket.

FIG. 5 is a state diagram shows the flow from connecting a TCP socket to a streaming socket, using the streaming socket, and closing the streaming socket (leaving the TCP socket connected). The state transition comprises the following steps:
   Step 501: Starting streaming socket at an idle state.
   Step 502: When connecting TCP socket to Streaming socket, resetting streaming socket timer counter and streaming socket send buffer to zero.
   Step 503: Streaming socket is now in connected mode.
   Step 504: When escaping from streaming socket mode to idle state, forcing send buffer out TCP socket.
   Step 505: When Internet client sending character, placing received character into streaming socket send buffer and resetting the streaming socket time counter.
   Step 506: If send buffer is not full, keeping the received characters in streaming socket send buffer.
   Step 507: If send buffer is full, forcing send buffer out TCP socket.
   Step 508: If streaming socket send buffer has data, forcing out TCP socket and resetting streaming socket timer counter.
   Step 509: When TCP segment is received on the streaming socket, sending data to Internet client.

The sending of TCP packets from the streaming socket buffer is controlled by a Streaming socket timer. The streaming socket timer is usually a value between 1 milliseconds and 5 seconds. When a client sends a character to the streaming socket the timer is reset and starts counting down. If the streaming socket doesn't receive a character before the timer expires it will send any data waiting to be sent across the TCP socket. This allows data to be packaged up into groups instead of sending one packet for each character or having to know beforehand how many characters the client will be sending. Slower timer values can provide efficiencies even for interactive use.

D. Connect to an HTTP Server

In one embodiment, the Internet server 18 is an HTTP server. A simple CGI program on the HTTP server can accept an HTTP GET with data parameters, and process the data, possibly checking for checksums included in the data, possibly parsing the data for specific information. A response can be generated on the fly and returned in the same HTTP GET transaction, possibly containing status, or configuration information. The data can then be stored in a database or simple file. This also provides a capability for dynamic formatting a presentation of the data in HTML format for a web browser. This can be done through various means, depending on the data storage and the Web tools available. The Internet client 11 established a TCP streaming socket 13 to the HTTP server 18 as described in the above section.

Once a TCP streaming socket 13 is established, the Internet client 11 may communicate with the Internet server 18 through the Internet modem 12 as illustrated in the following steps:
   Performing a GET to a CGI program running on the HTTP server by the Internet client;
   Sending parameter data to the CGI program by the Internet client;
   Parsing the parameter data and saving it to the HTTP server by the CGI program;
   Returning data from the CGI program to the Internet client 11. The data can be viewed through a PC web browser.

After the Internet transaction has been performed, the TCP streaming socket 13 can be released and the modem 12 is hang up as described in the above section.

E. Connect to a SMTP Server

The TCP streaming socket 13 also provides a straightforward way to transmit data with an SMTP server. In another embodiment, the Internet server 18 is an SMTP server. The Internet client 11 uses the Internet modem 12 to send data to a specific email address through the SMTP server.

Once a TCP streaming socket 13 is established, the Internet client 11 may communicate with the Internet server 18 through the Internet modem 12 as illustrated in the following steps:
   Entering a return email address by the Internet client 11;
   Entering one or more target email addresses by the Internet client 11;
   Sending data to the SMTP server by the Internet client 11. The data can be retrieved from the mailbox of the target email address.

After the Internet transaction has been performed, the TCP streaming socket 13 can be released and the modem 12 is hang up as described in the above section.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. An Internet device for communicating with an Internet server by an Internet client, said Internet device comprising:
a command processor that accepts a command line interface;
a TCP/IP stack that can be opened and closed, send and receive data;
a streaming socket that can be attached to an open socket of said TCP/IP stack; and
a plurality of Internet specific configuration elements to configure said command line interface;
wherein said Internet device communicates with said Internet client through a serial port and said Internet device communicates with said Internet server over any of a phone system, at least one of wireless, cell, and mobile phone, data network, or local area network;
wherein said Internet device is capable communicating using a plurality of streaming sockets simultaneously;
wherein said Internet device can be operated in any of the following modes:
command mode that accepts standard modem AT commands;
data mode that passes input bytes to a connected remote Internet device;
Internet session command mode that accepts said command line interface; and
Internet session streaming socket mode that transmits data to and from said Internet server;
wherein said command line interface uses a command line starting with an Internet ready code, followed by an Internet ready command, and terminated by a carriage-return character;
wherein a result code from executing said command line can be words or numeric characters;
wherein said Internet ready command is selected from a group consisting of:
a first command that checks whether said Internet device is Internet ready enabled;
a second command that starts device connection and negotiates PPP;
a third command that starts device termination and terminates PPP;
a fourth command that starts device connection to said Internet server through TCP socket and transitions said Internet device to Internet session streaming socket mode;
a fifth command that resumes said Internet session streaming socket mode with a socket that has been connected through a T command that starts said device connection to said Internet server;
a sixth command that closes a socket and releases resources allocated to the socket;
a seventh command that sets up a socket resource to allow UDP communications;
an eighth, command that returns a UDP datagram from a UDP socket that has been set up;
a ninth command that sends a UDP datagram containing desired data;
a tenth command that sets and shows said Internet specific configuration elements of said Internet device; and
an eleventh command that disables said Internet ready command processing.

2. The Internet device of claim 1, wherein said result code of said Internet ready commands can be set using a standard modem "ATV" command.

3. The Internet device of claim 1, wherein said Internet ready code is "IR".

4. An Internet device for communicating with an Internet server by an Internet client, said Internet device comprising:
a command processor that accepts a command line interface;
a TCP/IP stack that can be opened and closed, send and receive data;
a streaming socket that can be attached to an open socket of said TCP/IP stack; and
a plurality of Internet specific configuration elements to configure said command line interface;
wherein said Internet device communicates with said Internet client through a serial port and said Internet device communicates with said Internet server over any of a phone system, at least one of wireless, cell, and mobile phone, data network, or local area network;
wherein said Internet device is capable communicating using a plurality of streaming sockets simultaneously;
wherein said Internet specific configuration elements comprise:
a first and a second read-only S-Register, each of which contains a 3-character string that represents a current operating status of physical sockets in said Internet device;
a third and a fourth read-only S-Register, each of which contains a source port of physical sockets in said Internet device;
a fifth S-Register that contains an IP address of said Internet device, wherein said IP address is statically assigned;
a sixth S-Register that contains an IP address of a primary domain name server;
a seventh S-Register that contains an ASCII Hex byte storing the configuration of Internet ready command interface;
an eighth S-Register that contains TCP Stream tick time used to determine when to send TCP segments; and
a ninth S-Register that can store AT and IR commands so that said commands can be sent to said Internet device and be executed.

5. The Internet device of claim 4, wherein said fourth read-only S-Register contains a valid IP address established during PPP negotiation.

6. A method of communicating through a network device, comprising:
creating a first streaming socket; and
creating a second streaming socket;
wherein the network device is capable of communicating using the first and second streaming sockets simultaneously;
wherein the network device operates in a plurality of modes including an Internet session command mode that accepts a command line interface that uses a command line starting with an Internet ready code, an Internet ready command, and a carriage-return character, the Internet ready command being selected from a group consisting of; a first command that checks whether the network device is Internet ready enabled; a second command that starts device connection and negotiates PPP; a third command that starts device termination and terminates PPP; a fourth command that starts device connection to an Internet server through TCP socket and transitions the network device to Internet session streaming socket mode; a fifth command that resumes Internet session streaming socket mode with a socket that has been connected through a T command that starts device connection to the Internet server; a sixth command that closes a socket and releases resources allocated to the socket; a seventh command that sets up a socket resource to allow UDP communications; an eighth command that returns a UDP datagram from a UDP socket that has been set up; a ninth command that sends a UDP datagram containing desired data; a tenth command that sets and shows Internet specific configuration elements of the network device; and an eleventh command that disables the Internet ready command processing.

7. The method of claim 6, wherein the network device includes a modem.

8. The method of claim 6, wherein the network device includes an Internet modem.

9. The method of claim 6, wherein the streaming sockets are capable of being attached to an open socket of a TCP/IP stack.

10. The method of claim 6, wherein the streaming sockets are capable of utilizing the TCP socket over an asynchronous serial data channel.

11. The method of claim 6, wherein the streaming sockets are capable of utilizing the TCP socket over a synchronous serial data channel.

12. The method of claim 6, wherein the streaming sockets are capable of being utilized to share a data channel with a plurality of TCP sockets.

13. An apparatus, comprising:
at least one network device capable of creating a first streaming socket and a second streaming socket;
wherein the network device is capable of communicating using the first and second streaming sockets simultaneously;
wherein the network device operates in a plurality of modes including an Internet session command mode that accepts a command line interface that uses a command line starting with an Internet ready code, an Internet ready command, and a carriage-return character, the Internet ready command including at least one of: a first command that checks whether the network device is Internet ready enabled; a second command that starts device connection and negotiates PPP; a third command that starts device termination and terminates PPP; a fourth command that starts device connection to an Internet server through TCP socket and transitions the network device to Internet session streaming socket mode; a fifth command that resumes Internet session streaming socket mode with a socket that has been connected through a T command that starts device connection to the Internet server; a sixth command that closes a socket and releases resources allocated to the socket; a seventh command that sets up a socket resource to allow UDP communications; an eighth command that returns a UDP datagram from a UDP socket that has been set up; a ninth command that sends a UDP datagram containing desired data; a tenth command that sets and shows Internet specific configuration elements of the network device; and an eleventh command that disables the Internet ready command processing.

14. The apparatus of claim 13, wherein the network device includes a modem.

15. The apparatus of claim 13, wherein the network device includes an Internet modem.

16. The apparatus of claim 13, wherein the streaming sockets are capable of being attached to an open socket of a TCP/IP stack.

17. The apparatus of claim 13, wherein the streaming sockets are capable of being utilized to share a data channel with a plurality of TCP sockets.

* * * * *